US012415189B2

(12) United States Patent
Edwards et al.

(10) Patent No.: US 12,415,189 B2
(45) Date of Patent: Sep. 16, 2025

(54) TRANSCRITICAL $CO_2$ PULVERIZATION

(71) Applicant: Rockburst Technologies Inc., Vancouver (CA)

(72) Inventors: Clifford Edwards, Vancouver (CA); Peter Von Behrens, Vancouver (CA); Rob Stephens, Vancouver (CA)

(73) Assignee: Rockburst Technologies Inc., Vancouver (CA)

( * ) Notice: Subject to any disclaimer, the term of this patent is extended or adjusted under 35 U.S.C. 154(b) by 288 days.

(21) Appl. No.: 18/123,889

(22) Filed: Mar. 20, 2023

(65) Prior Publication Data

US 2023/0241620 A1 Aug. 3, 2023

Related U.S. Application Data

(63) Continuation of application No. PCT/CA2021/051407, filed on Oct. 6, 2021.

(60) Provisional application No. 63/088,273, filed on Oct. 6, 2020.

(51) Int. Cl.
*B02C 19/18* (2006.01)
*B02C 19/00* (2006.01)

(52) U.S. Cl.
CPC .......... *B02C 19/18* (2013.01); *B02C 19/0043* (2013.01)

(58) Field of Classification Search
None
See application file for complete search history.

(56) References Cited

U.S. PATENT DOCUMENTS 2,560,807 A * 7/1951 Lobo ........................ B02C 19/18 241/24.31
2,668,669 A * 2/1954 Skelly ................. B02C 19/0056 241/1
3,257,080 A 6/1966 Snyder
3,545,683 A * 12/1970 Schulte ................... B02C 19/18 241/1
3,895,760 A 7/1975 Snyder
4,313,737 A * 2/1982 Massey ................... B03B 9/005 241/20
4,775,387 A 10/1988 Narain et al.
2003/0026975 A1* 2/2003 Rouse ..................... B02C 19/18 241/2

FOREIGN PATENT DOCUMENTS

EP 1186625 A2 3/2002

* cited by examiner

*Primary Examiner* — Jared O Brown
(74) *Attorney, Agent, or Firm* — Roni M. Jones; Oyen Wiggs Green & Mutala LLP

(57) ABSTRACT

Methods and apparatus for comminution of solid materials. Solid materials are introduced into a first pressure vessel. A working fluid is provided in the first pressure vessel at an operating pressure and an operating temperature. The working fluid is allowed to permeate into the solid materials. The working fluid may permeate into the solid materials while in a supercritical fluid phase. The working fluid is rapidly expanded to thereby create fractured solid materials from the solid materials. Rapidly expanding the working fluid may comprise causing a transition of the working fluid from a supercritical phase with a first density to a subcritical vapour phase with a second density.

18 Claims, 5 Drawing Sheets

TRANSCRITICAL $CO_2$ PULVERIZATION

CROSS-REFERENCE TO RELATED APPLICATION

This application is a continuation of Patent Cooperation Treaty (PCT) application No. PCT/CA2021/051407 having an international filing date of 6 Oct. 2021, which in turn claims priority from, and for the purposes of the United States the benefit of 35 USC § 119 in respect of, U.S. application No. 63/088,273 filed 6 Oct. 2020. All of the applications in this paragraph are hereby incorporated herein by reference.

TECHNICAL FIELD

This invention relates generally to methods and systems for comminution of solid materials and in particular to methods and systems for comminution of ore-bearing or aggregate rock.

BACKGROUND

In mineral processing, comminution is employed to reduce the size of ore-bearing rocks. Comminution may facilitate further processing of ore-bearing rocks by reducing their size, increasing their surface area and freeing useful materials from undesirable materials in which they may be embedded.

Comminution typically includes one or more of crushing, blasting, cutting, vibrating and grinding. In some cases, rocks are crushed to achieve a more manageable size for grinding. Crushing may be accomplished by compressing rocks against rigid surfaces, or by impacting rock against surfaces in a constrained motion path. Crushing is often performed in several stages. There are a number of crushers available such as jaw, gyratory, cone, roll, and impact crushers.

Crushing may handle rocks as large as 150 cm in diameter and may reduce such rocks down to approximately 2 cm or 5 mm fragments which are then reduced to fine particles through grinding.

Traditional forms of crushing and grinding may require large amounts of energy. For example, in some cases, to achieve particle sizes on the scale of 100 μm, crushing and grinding requires between 10 kWh and 30 kWh per tonne of rock. Some estimates suggest that comminution in the field of mineral processing consumes up to 4% of global electrical energy and about 50% of the energy of each mine site.

There is a general desire to reduce the energy required for comminution of solid materials such as, but not limited to, ore-bearing rock without reducing the effectiveness of the comminution process.

Comminution of solid materials often causes undesirable wear on the machines involved. For example, the steel balls and liners of grinders may need to be replaced regularly due to undesirable wear.

There is a general desire to reduce the maintenance required of machines employed for comminution of solid materials, such as, but not limited to, ore-bearing rock without reducing the effectiveness of the comminution process.

The foregoing examples of the related art and limitations related thereto are intended to be illustrative and not exclusive. Other limitations of the related art will become apparent to those of skill in the art upon a reading of the specification and a study of the drawings.

SUMMARY

One aspect of the invention provides a method for comminution of solid materials. The method may comprise introducing solid materials into a first pressure vessel, providing a working fluid in the first pressure vessel at an operating pressure and an operating temperature, allowing the working fluid to permeate into the solid materials, and rapidly expanding the working fluid to thereby create fractured solid materials from the solid materials.

In some embodiments, the working fluid is allowed to permeate into the solid materials while in a supercritical fluid phase. In some embodiments, the working fluid is allowed to permeate into the solid materials while in a subcritical fluid (e.g. liquid, vapour or gas) phase.

In some embodiments, the operating temperature is greater than a critical temperature of the working fluid. In some embodiments, the operating pressure is greater than a critical pressure of the working fluid. In some embodiments, the operating temperature is lower than a critical temperature of the working fluid. In some embodiments, the operating pressure is lower than a critical pressure of the working fluid.

In some embodiments, rapidly expanding the working fluid comprises reducing the pressure of the working fluid from the operating pressure to a second pressure lower than the operating pressure. In some embodiments, the second pressure is below a critical pressure of the working fluid.

In some embodiments, the method comprises reducing the pressure of the working fluid from the operating pressure to the second pressure over a time period of 30 ms or less (e.g. in the range of about 1 ms to about 30 ms).

In some embodiments, rapidly expanding the working fluid comprises causing a transition of the working fluid from a supercritical phase with a first density to a subcritical vapour phase with a second density. In some embodiments, rapidly expanding the working fluid comprises causing a transition of the working fluid from a liquid or dense fluid phase with a first density to a gas or vapour phase with a second density. In some embodiments, the first density is at least 2 times greater than the second density. In some embodiments, the first density is at least 10 times greater than the second density. In some embodiments, the first density is at least 100 times greater than the second density.

In some embodiments, allowing the working fluid to permeate into the solid materials comprises maintaining the working fluid at the operating temperature and the operating pressure within the first pressure vessel for a period of time. The period of time may, for example, be in the range of approximately 1 millisecond to approximately 60 seconds. In some applications it can be beneficial to maintain the working fluid at the operating temperature and the operating pressure within the first pressure vessel for a longer period such as a period in the range of approximately 1 minute to approximately 60 minutes.

In some embodiments, the solid materials comprise porous ore-bearing rock. In some embodiments, the working fluid comprises $CO_2$.

In some embodiments, the operating temperature is greater than 0.0° C. In some embodiments, the operating temperature is between about 0.0° C. and 31.0° C. In some embodiments, the operating temperature is greater than 31.0° C. In some embodiments, the operating temperature is between 31.1° C. and 100.0° C. In some embodiments, the operating pressure is greater than 5.2 bar. In some embodiments, the operating pressure is between about 5.2 bar and 73.8 bar. In some embodiments, the operating pressure is greater than 73.8 bar. In some embodiments, the operating pressure is in the range of 73.9 bar to 200 bar or 73.9 bar to 300 bar.

In some embodiments, introducing solid materials into a first pressure vessel comprises mixing the solid materials with a liquid to form a slurry and introducing the slurry into the first pressure vessel. In some embodiments, allowing the working fluid to permeate into the solid materials comprises allowing the liquid to absorb at least some of the working fluid and allowing at least some of the working fluid to permeate into the solid materials. In some embodiments, allowing the working fluid to permeate into the solid materials comprises separating the solid materials from the slurry and allowing the working fluid to permeate into the separated solid materials. In some embodiments, the method comprises re-combining the separated solid materials and the liquid to reform the slurry before rapidly expanding the working fluid to thereby create fractured solid materials from the solid materials. In some embodiments, rapidly expanding the working fluid to thereby create fractured solid materials from the solid materials comprises expelling the slurry from the first pressure vessel. In some embodiments, the method comprises directing the slurry at a solid surface to cause further pulverization of the fractured solid materials.

In some embodiments the method comprises warming the solid materials before introducing the solid materials into the first pressure vessel.

In cases where water is used, e.g. to form a slurry, the water may be reused. In cases where the water is reused the water may be conditioned before reuse, for example, to remove particles of the solid materials and/or to remove dissolved substances from the water. The water conditioning may, for example, include settling and/or filtration. In some embodiments the water conditioning removes carbonic acid from the water.

In some embodiments, the method comprises introducing filler elements into gaps between the solid materials in the first pressure vessel. The filler elements take up space and thereby reduce the amount of working fluid required to achieve a desired pressure within the first pressure vessel. The filler elements may, for example, comprise elements of a metal such as steel or another material that is robust and not susceptible to itself being comminuted in performance of the method. For example, the filler elements may comprise steel balls. After the solid materials have been comminuted the filler elements may be separated and reused.

In some embodiments, reducing the pressure of the working fluid to the second pressure comprises opening a valve to release at least some of the working fluid through the valve into a second pressure vessel for recapture.

In some embodiments in which the working fluid is captured and recycled for use in processing more solid materials, the working fluid is conditioned before it is recycled. For example, the conditioning may comprise separating entrained particles of the solid materials (e.g. rock dust or rock particles) from the working fluid. The separating may, for example, comprise filtering, settling, centrifugation or combinations of these. In cases where the working fluid is captured as a gas the conditioning may include repressurizing the working fluid. The repressurizing may carry the working fluid through a phase change e.g. from a gas to a liquid or from a gas to a supercritical fluid. For example, where the working fluid comprises $CO_2$, the conditioning may comprise one or more of:

- cooling, condensing and liquifying the $CO_2$ before increasing the pressure of the liquefied $CO_2$ to cause the $CO_2$ to undergo a phase change to supercritical $CO_2$;
- directly compressing captured gaseous $CO_2$ to cause a transition to a supercritical phase and removing heat as required;

a hybrid combination comprising both pumping liquefied $CO_2$ to a pressure sufficient to yield supercritical $CO_2$ and also compressing some gaseous $CO_2$ to yield more supercritical $CO_2$.

In some embodiments, after rapidly expanding the working fluid and before removing the fractured solid materials from the first pressure vessel, the method comprises increasing the pressure of the working fluid in the first pressure vessel to the operating pressure, and rapidly expanding the working fluid to further fracture the fractured solid materials.

In some embodiments, after rapidly expanding the working fluid and before removing the fractured solid materials from the first pressure vessel, the method comprises increasing the temperature of the working fluid in the first pressure vessel to the operating temperature, and rapidly expanding the working fluid to further fracture the fractured solid materials.

In some embodiments, after rapidly expanding the working fluid and before removing the fractured solid materials from the first pressure vessel, the method comprises increasing the temperature of the working fluid in the first pressure vessel to the operating temperature, increasing the pressure of the working fluid in the first pressure vessel to the operating pressure, and rapidly expanding the working fluid to further fracture the fractured solid materials.

In some embodiments, increasing the pressure of the working fluid to the operating pressure comprises injecting working fluid recaptured in a second pressure vessel into the first pressure vessel, wherein the recaptured working fluid was recaptured during a step of rapidly expanding the working fluid.

The solid materials may be introduced into the first pressure vessel either while the first pressure vessel is depressurized or while a pressure exceeding atmospheric pressure is maintained in the first pressure vessel. In some embodiments, introducing solid materials into the first pressure vessel comprises introducing solid materials into the first pressure vessel while maintaining a pressure within the first pressure vessel greater than atmospheric pressure.

In some embodiments, introducing solid materials into the pressure vessel comprises introducing solid materials into the first pressure vessel through a first airlock, a first lock hopper or a first piston feed.

In some embodiments, the method comprises removing the fractured solid materials from the pressure vessel while maintaining a pressure within the first pressure vessel greater than atmospheric pressure.

In some embodiments, removing the fractured solid materials from the first pressure vessel comprises removing the fractured solid materials from the first pressure vessel through the first airlock, a second airlock, the first lock hopper, a second lock hopper, the first piston feed, a second piston feed, a rotary valve, a plug-forming feeder or a dynamic feeder.

Some embodiments include purging air and/or non-condensing fluids from the system. For example the first pressure vessel may be purged before or during introducing the working fluid into the first pressure vessel. In some cases some of the working fluid may be intermixed with air or other fluids being purged. In such cases the method may include separating the intermixed working fluid from the other fluids being purged (e.g. $CO_2$ may be separated from purged air and/or water).

Another aspect of the invention provides an apparatus for comminution of solid materials. The apparatus may comprise means for performing any of the steps of the methods described herein and the methods may include any mode of using the apparatus as described herein. The apparatus may comprise a first pressure vessel, the first pressure vessel comprising a first chamber, a first pump connected to pump a working fluid into the first chamber through a second inlet, a second pressure vessel connected to the first chamber by a first valve, wherein when the first valve is open, at least some of the working fluid within the first chamber is allowed to flow out of a first outlet and into a second chamber of the second pressure vessel.

In some embodiments, the apparatus comprises a temperature sensor for measuring a temperature of contents of the first pressure vessel, a thermal control system for heating or cooling the contents of the first pressure vessel, and a temperature controller for controlling the thermal control system based at least in part on measurements from the temperature sensor.

In some embodiments, the temperature controller is configured to maintain the temperature of the contents of the first pressure vessel at an operating temperature of the working fluid. In some embodiments, the temperature controller is configured to maintain the temperature of the contents of the first pressure vessel above a critical temperature of the working fluid.

In some embodiments, the apparatus comprises a pressure sensor for determining a pressure inside the first chamber, and a pressure controller for controlling the first pump based at least in part on measurements from the pressure sensor.

In some embodiments, the pressure controller is configured to maintain the pressure inside the first chamber at an operating pressure. In some embodiments, the pressure controller is configured to maintain the pressure inside the first chamber above a critical pressure. In some embodiments, the pressure controller is configured to maintain the pressure inside the first chamber above a critical pressure of the working fluid for less than 60 seconds before the first valve is opened.

In some embodiments, the second pressure vessel is connected to the first pump and the first pump is connected to pump working fluid from the second pressure vessel into the first pressure vessel.

In some embodiments, the apparatus comprises a second pump configured to pump working fluid from the second pressure vessel into the first pressure vessel.

In some embodiments, the first inlet comprises a first airlock, a first lock hopper or a first piston feed.

In some embodiments, the first pressure vessel comprises a second outlet for removing fractured solid materials from the first chamber, the second outlet comprising the first airlock, a second airlock, the first lock hopper, a second lock hopper, the first piston feed, a second piston feed, a rotary valve, a plug-forming feeder or a dynamic feeder.

Further aspects and example embodiments are illustrated in the accompanying drawings, the claims and/or described in the following description.

It is emphasized that the invention relates to all combinations of the above features, even if these are recited in different claims.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides methods for comminution of solid materials. In some embodiments, the solid materials comprise ore-bearing rocks. In some embodiments, the solid materials comprise non-ore-bearing rocks such as limestone. The method(s) may comprise introducing solid materials into a first pressure vessel and injecting a working fluid, such as $CO_2$ into the first pressure vessel. The pressure and temperature inside of the first pressure vessel may be maintained at a desired pressure and a desired temperature. In some embodiments, the working fluid (e.g. $CO_2$) is in a supercritical phase at the desired pressure and temperature. In some embodiments, the supercritical phase is a liquid or vapour phase. In some embodiments, the working fluid is a "dense fluid" (e.g. when pressure is above the critical pressure of the working fluid and the temperature is below the critical temperature of the working fluid) at the desired pressure and temperature. The working fluid may be allowed to penetrate and/or permeate into the solid materials (e.g. through one or more pores of the solid materials). Once sufficient permeation is achieved, the working fluid may then be caused to expand (e.g. decrease in density) at a high rate. The rapid expansion may be achieved by causing a phase change (e.g. from a supercritical phase to a subcritical vapour phase or from a liquid phase to a vapour phase, etc.). The phase change of the working fluid may be achieved by varying the pressure and/or the temperature of the working fluid within the first pressure vessel. When the working fluid expands, it may drive a pressure wave through the solid materials from within cracks and pores of solid materials, thereby causing rock fracturing and/or pulverization driven from within. In some embodiments, the temperature and/or pressure and/or phase of the working fluid is varied repeatedly to cause a plurality of rapid expansions of the working fluid. Each successive rapid expansion of the working fluid may cause further comminution of the solid materials until a desired particle size is achieved.

Figure 1:
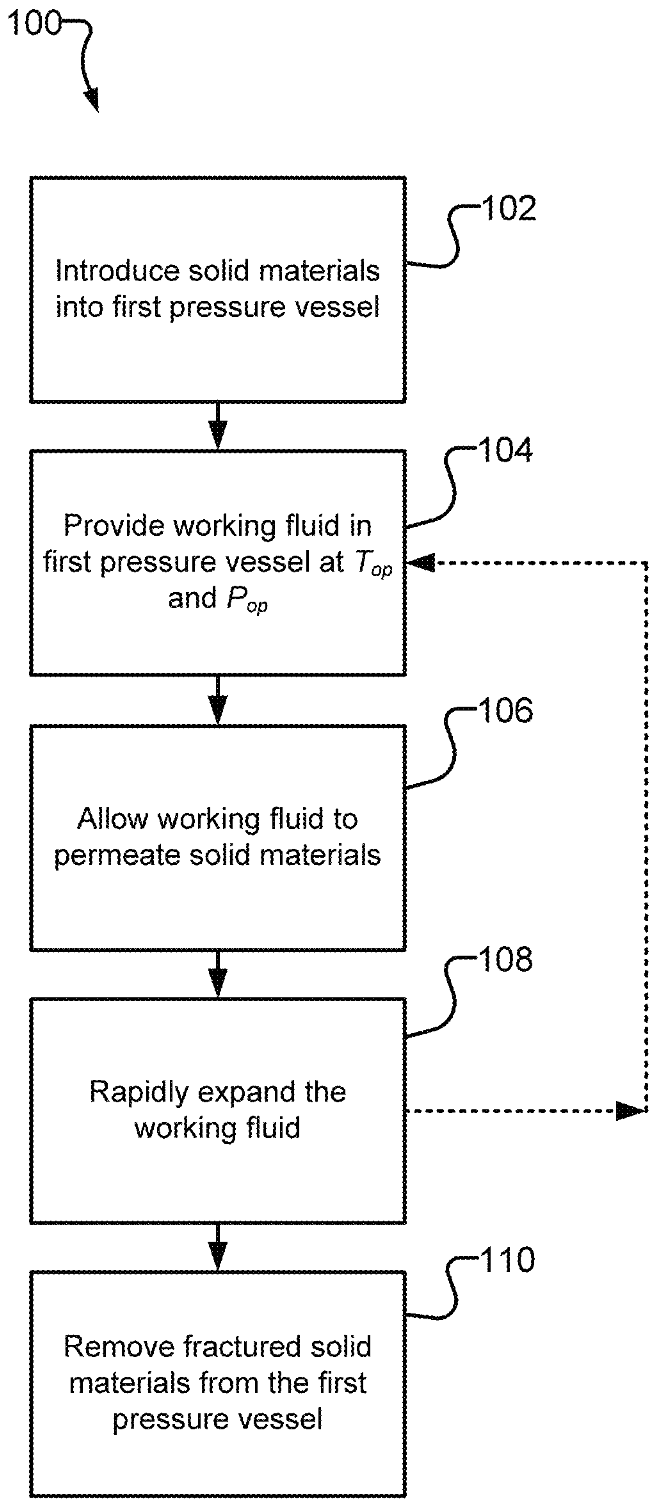
FIG. 1 depicts an exemplary non-limiting method for comminution of solid materials according to one embodiment of the invention.
Figure 2:
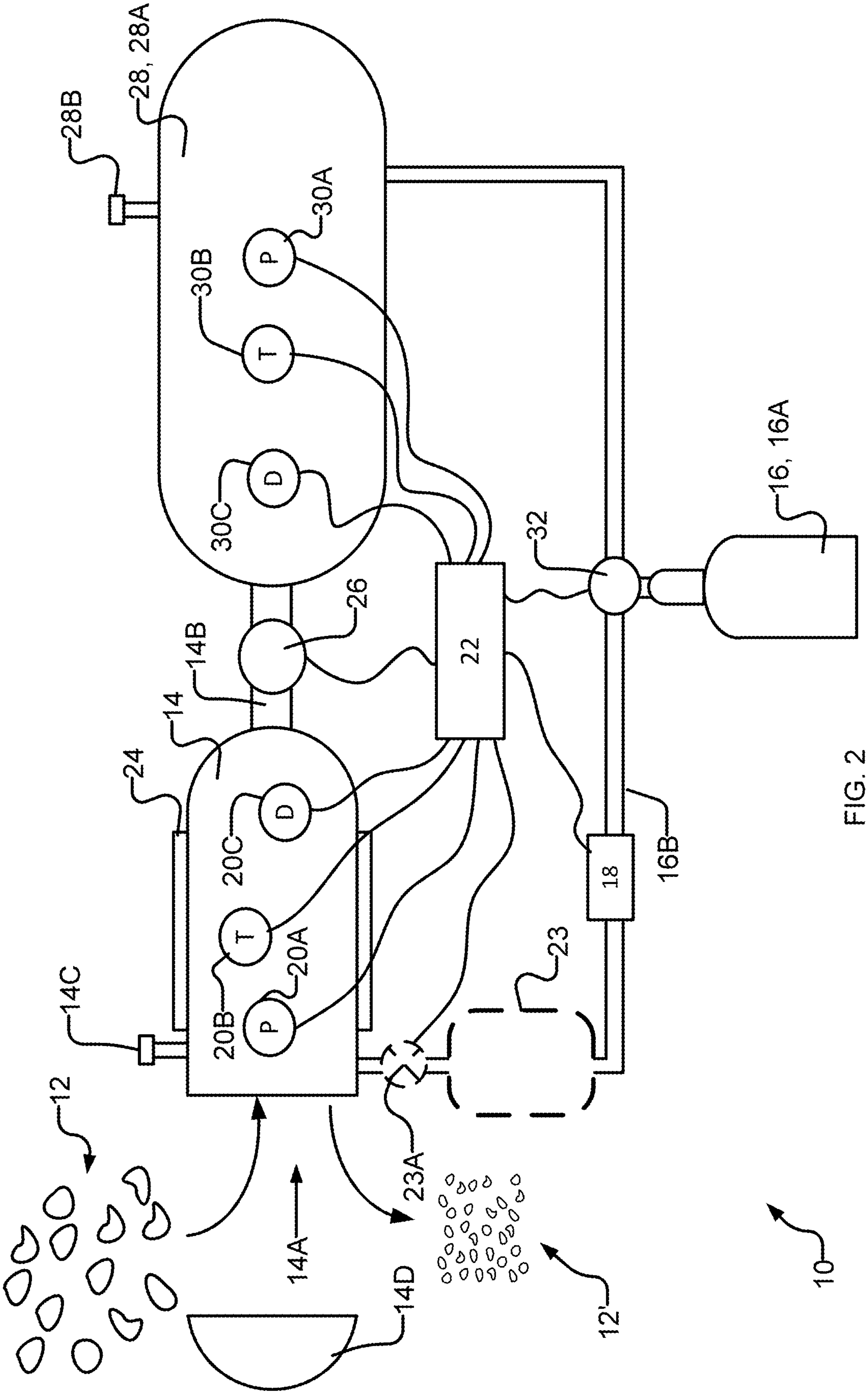
FIG. 2 depicts an exemplary non-limiting apparatus for comminution of solid materials according to one embodiment of the invention.

FIG. 1 depicts an exemplary, non-limiting method 100 for comminution of solid materials 12 to produce fractured solid materials 12'. FIG. 2 depicts an exemplary, non-limiting apparatus 10 that may be employed to carry out method 100. It should be understood that method 100 may be carried out on apparatuses other than apparatus 10 and methods other than method 100 may be carried out on apparatus 10.

Solid materials 12 may comprise porous solid materials. For example, solid materials 12 may comprise rocks. In some embodiments, solid materials 12 comprise ore-bearing rocks. The ore may comprise, without limitation, oxides, sulfides, silicates, native metals such as nickel, zinc, copper, noble metals such as gold, platinum or silver, etc. In some embodiments, solid materials 12 comprise non-ore-bearing rocks such as, but not limited to, limestone.

Solid materials 12 may vary in size. For example, in some embodiments, solid materials 12 comprise particles having a maximum dimension of between approximately 5 cm and 3 m or between approximately 50 cm and 2 m. In some embodiments, solid materials 12 comprise particles having a maximum dimension of less than approximately 5 cm or less than 2.5 cm. In some embodiments, solid materials 12 comprise a mixture of particles of different sizes. In some embodiments, solid materials 12 can be sorted prior to performing method 100.

Step 102 of method 100 comprises introducing solid materials 12 into a first chamber 14A of a first pressure vessel 14. In some embodiments, solid materials 12 are dried, wetted, and/or cleaned prior to step 102, although this is not mandatory. First pressure vessel 14 may comprise any suitable pressure vessel.

In some embodiments, introducing solid materials 12 into first chamber 14A comprises depressurizing first chamber 14A (e.g. to at or near atmospheric pressure) before inserting solid materials 12 into first chamber 14A. For example, in the illustrated embodiment, first chamber 14A may be depressurized before a cover 14D of first pressure vessel 14 is removed to provide access to first chamber 14A to facilitate insertion of solid materials 12. In some embodiments, after solid materials 12 are introduced into first chamber 14A of first pressure vessel 14, first pressure vessel 14 may be sealed (e.g. by fastening cover 14D).

In some embodiments, first pressure vessel 14 is configured to allow introduction of solid materials 12 into first chamber 14A without depressurizing first chamber 14A or while maintaining a pressure greater than atmospheric pressure within first chamber 14A. For example, an airlock, rotary valves, a lock hopper, plug-forming feeders, piston feeders, dynamic feeders, slurry feeders or the like may be provided for insertion of solid materials 12 into first chamber 14A while maintaining first chamber 14A at a pressure greater than atmospheric pressure.

For example, in some embodiments, a lock hopper (not depicted) is provided to facilitate introduction of solid materials 12 into first chamber 14A without depressurizing first chamber 14A or while maintaining a pressure greater than atmospheric pressure within first chamber 14A. The lock hopper may comprise an input valve from atmosphere to the lock hopper chamber, and an output valve from the lock hopper chamber to the first chamber 14A. With the output valve closed, the input valve is opened to allow delivery of solid materials 12 into the lock hopper at atmospheric pressure. After solid materials 12 are in the lock hopper chamber, the input valve is closed. The pressure inside the lock hopper chamber is then increased to approximately the same pressure as is present in first chamber 14A. This may be accomplished by introducing fluid from first chamber 14A into the lock hopper chamber and/or by additional pumping or compression apparatus such as a pump, compressor or pressurized chamber. The output valve of the lock hopper is subsequently opened to allow solid materials 12 to flow into the first chamber 14A. The output valve is then closed, and the lock hopper chamber pressure is reduced. This may be accomplished by returning fluid back to first chamber 14A, or otherwise.

As another example, in some embodiments, a piston feeder (not depicted) is provided to allow introduction of solid materials 12 into first chamber 14A without depressurizing first chamber 14A or while maintaining a pressure greater than atmospheric pressure within first chamber 14A. A piston feeder may function in a similar manner to the lock hopper described above but may employ ports instead of valves. The ports may be opened or closed by moving the piston from a first position (in which an input port is open and an output port is closed) to a second position (in which the input port is closed and the output port is open).

Step 104 of method 100 comprises providing a working fluid 16 in first pressure vessel 14. In some embodiments, working fluid 16 is present in first pressure vessel before step 104. In some embodiments, air is removed from first pressure vessel 14 prior to or during insertion of working fluid 16 into first pressure vessel 14, although this is not mandatory. For example, in some embodiments, a vacuum removes air from first pressure vessel 14 and/or air is purged from first pressure vessel 14 by insertion of working fluid 16 or another suitable fluid (e.g. an inert gas).

Working fluid 16 may comprise any suitable working fluid. In some embodiments, working fluid 16 comprises a fluid having a critical pressure in the range of about 73 bar to about 221 bar and a critical temperature in the range of about 31° C. to about 374° C. In some embodiments, working fluid 16 has low surface tension low viscosity, high diffusivity and/or high solubility. In some embodiments, working fluid 16 comprises water. In some embodiments, working fluid 16 comprises nitrogen gas. In some embodiments, working fluid 16 comprises ethane. In some embodiments, working fluid 16 comprises $CO_2$.

In some embodiments, working fluid 16 is delivered, for example, from a working fluid source 16A such as, a gas cylinder and through a conduit 16B to first pressure vessel 14. In some embodiments, recaptured working fluid 16 is delivered to first pressure vessel 14 from a second pressure vessel 28, as is discussed further herein.

Step 104 comprises providing working fluid 16 in first chamber 14A at an operating pressure, $P_{op}$, and an operating temperature, $T_{op}$. In some embodiments, working fluid 16 is injected into first chamber 14A at the operating pressure, $P_{op}$, and/or the operating temperature, $T_{op}$. In other embodiments, step 104 comprises raising pressure and/or temperature of working fluid 16 to achieve the operating pressure, $P_{op}$, and the operating temperature, $T_{op}$, after working fluid 16 is injected into first chamber 14A.

In some embodiments, the operating pressure, $P_{op}$, and the operating temperature, $T_{op}$, are chosen to achieve a supercritical phase of working fluid 16. In some embodiments, the operating pressure, $P_{op}$, comprises a pressure greater than the critical pressure of working fluid 16 and the operating temperature, $T_{op}$, comprises a temperature that is greater than the critical temperature of working fluid 16. In some embodiments, the operating pressure, $P_{op}$, and the operating temperature, $T_{op}$, are chosen to achieve a dense fluid phase of working fluid 16 (e.g. the operating pressure, $P_{op}$, is above the critical pressure of working fluid 16 and the operating temperature, $T_{op}$, is below the critical temperature of working fluid 16).

For example, $CO_2$ is in its supercritical phase at a pressure of greater than 73.8 bar and a temperature of greater than 31.0° C. As such, where working fluid 16 comprises $CO_2$, the operating pressure, $P_{op}$, comprises a pressure of greater than 73.8 bar and the operating temperature, $T_{op}$, comprises a temperature of greater than 31.0° C. (to achieve supercritical $CO_2$) or the operating temperature, $T_{op}$, comprises a temperature of below 31.0° C. (to achieve dense fluid $CO_2$). In some embodiments where working fluid 16 comprises $CO_2$, the operating pressure, $P_{op}$, comprises a pressure of greater than 73.8 bar and less than approximately 200 bar or 300 bar. In some embodiments, the operating temperature, $T_{op}$, comprises a temperature of greater than 31.0° C. and less than approximately 100.0° C.

$CO_2$ is a desirable working fluid 16 for a variety of reasons. The energy efficiency of method 100 may be improved since $CO_2$ is in its supercritical phase at relatively low temperatures (e.g. temperature of greater than 31.0° C.). Similarly, the energy efficiency of method 100 may be improved since $CO_2$ may be in its supercritical phase at relatively low pressures (e.g. pressures greater than 73.8 bar). Further, $CO_2$ is easily obtainable, inexpensive, has low human hazard and has relatively low environmental impact. In some embodiments, $CO_2$ working fluid 16 may be obtained through direct capture from air, flue gas, exhaust gases, industrial gases or the like. $CO_2$ may be obtained using a commercially available carbon capture system. Further, $CO_2$ has minimal interaction with most ore-bearing rocks and will therefore not substantially degrade the resultant products of method 100.

In some embodiments, a pump (or compressor) 18 is provided to achieve a desired pressure of working fluid 16 within first chamber 14A of first pressure vessel 14 at step 104. Pump 18 may comprise any suitable pump or compressor.

In some embodiments, working fluid 16 in a gas or vapour phase is chilled and condensed into a liquid phase at an intermediate pressure and/or temperature (e.g. above approximately 5.2 bar and between approximately −56.6° C. and +31.1° C.) and the liquid phase working fluid 16 is pumped into first chamber 14A at step 104.

In other embodiments, the pressure of working fluid 16 is increased at step 104 by decreasing a volume of first chamber 14A. For example, a sealed piston may be employed to reduce a volume of first chamber 14A or a non-volatile liquid may be pumped into first chamber 14A to reduce a volume of first chamber 14A.

In some embodiments, the pressure of working fluid 16 is increased at step 104 by employing combustion. A first volume of working fluid 16 may be delivered into first chamber 14A. A mixture of air (and/or oxygen) and fuel (e.g. propane, diesel, natural gas, syngas, etc.) is introduced into a second chamber (e.g. second chamber 28A or another chamber, not depicted) connected to first chamber 14A. The mixture in the second chamber is then ignited thereby causing a rapid increase in pressure in the second chamber. In some embodiments, at least some of the fluid generated by ignition of the mixture in the second chamber may be delivered to first chamber 14A to increase the pressure at step 104. In other embodiments, the rapid expansion of fluid caused by the combustion may be employed to drive a piston (or the like) to reduce the volume of first chamber 14A or otherwise compress working fluid 16. Employing combustion at step 104 to increase the pressure of working fluid 16 may avoid losses that would otherwise be generated due to friction, inefficient mechanical pumping means, compressors, etc. and/or reduce or eliminate one or more moving parts that would otherwise be used for method 100 (e.g. compressors, fast acting valves, pressure regulators, pumps etc.). If concentrated oxygen is employed instead of air, the emissions of such combustion may be limited to (or substantially limited to) $CO_2$ (which may be used as working fluid 16) and water. Moreover, the heat produced by the combustion may be employed to achieve $T_{op}$ at step 104 of method 100.

A temperature of working fluid 16 may be raised or maintained within first pressure vessel 14 by employing a heat source 24. Heat source 24 may comprise any suitable heat source. As non-limiting examples, heat source 24 may comprise a heating jacket wrapped around at least a portion of first pressure vessel 14, an immersion heater placed within first pressure vessel 14, and/or a heat exchanger arranged to transfer heat into working fluid supply being delivered to pressure vessel 14 (e.g. in a supply pipe, 16B).

Undesirable accumulation of heat or loss of heat may be reduced by one or more of insulation (e.g. around first pressure vessel 14) and/or heat exchangers. For example, a heat exchanger could be provided to transfer heat removed from working fluid 16 at one step of process 100 (e.g. if working fluid 16 is cooled to achieve its liquid phase) to another step of process 100 (e.g. if working fluid 16 is heated to achieve its supercritical phase).

Apparatus 10 may comprise one or more sensors and one or more controllers to monitor and/or control the temperature, pressure and/or density of working fluid 16 within first chamber 14A. For example, in the illustrated embodiment, apparatus 10 comprises a pressure sensor 20A for measuring the pressure within first chamber 14A, a temperature sensor 20B for measuring the temperature within first chamber 14A and a density sensor 20C for measuring density of working fluid within first chamber 14A. Pressure sensor 20A and temperature sensor 20B and density sensor 20C are connected to a controller 22. Controller 22 may monitor the pressure within first chamber 14A and control pump 18 to achieve operating pressure, $P_{op}$. Similarly, controller 22 may monitor the temperature within first chamber 14A and control a heat source 24 to achieve operating temperature, $T_{op}$. Similarly, controller 22 may monitor density of the working fluid within first chamber 14A and control one or a combination of pump 18 and heat source 24 to achieve a desired operating density $D_{op}$.

Apparatus 10 may comprise other sensors such as one or more mass flow sensors that monitor amounts of one or more materials of different kinds that are moved through apparatus 10. For example, mass/mass flow sensors may be provided to monitor amounts of solids (e.g. rock) delivered into first chamber 14A, amounts of working fluid 16 delivered into or recovered from first chamber 14A and/or amounts of denser fluids such as liquid water delivered to or recovered from first chamber 14A.

Controller 22 may monitor the operational status of system 10 by way of sensors such as those described above and other sensors. As with other industrial controls, controller 22 may include an alarm system that triggers alarms if process parameters are out of limits and/or a malfunction of apparatus 10 is likely.

In some embodiments, one or more filters are provided to remove particulates (e.g. dust or dirt) from working fluid 16. For example, cyclonic or spiral tube separation, or a rotating disk filtration system for solids separation from liquid $CO_2$ in a continuous pressure filtration system, (also known as hyperbaric filtration) may be employed to remove particulates (e.g. dust or dirt) from working fluid 16.

Step 106 of method 100 comprises allowing working fluid 16 to permeate into solid materials 12 during a permeation time, $t_p$. In some embodiments, working fluid 16 permeates (or begins to permeate) into solid materials 12 during step 104 (e.g. during the time it takes to achieve operating pressure, $P_{op}$, and/or operating temperature, $T_{op}$). In some embodiments, working fluid 16 permeates (or begins to permeate) into solid materials 12 in a first phase (e.g. vapour phase) and then working fluid 16 undergoes a phase change (e.g. to liquid or dense fluid) during step 104 or 106. In some embodiments, permeation time, $t_p$, is in the range of about 0 to about 60 seconds. In some embodiments, permeation time, $t_p$, is in the range of about 0 to about 60 minutes. During step 106, working fluid 16 may penetrate into a porous structure of solid materials 12. In some embodiments, longer permeation times, $t_p$, may increase the depth of permeation of working fluid 16 into solid materials 12 and may decrease the size of fractured solid materials 12' resultant from method 100. In some embodiments, it is desirable to maintain the operating pressure, $P_{op}$, and the operating temperature, $T_{op}$ during $t_p$. Controller 22 may be employed to maintain the operating pressure, $P_{op}$, and the operating temperature, $T_{op}$ during $t_p$.

Step 108 comprises rapidly expanding working fluid 16. For example, in some embodiments, the working fluid 16 is caused to expand by 2 times, 10 times, 100 times, 250 times or even more than 500 times. As working fluid 16 expands, working fluid 16 may drive a pressure wave through solid materials 12 from within cracks and pores of solid materials 12, thereby causing fracturing and pulverization driven from within.

In some embodiments, an excess volume of working fluid 16 produced at step 108 is vented. In some embodiments, the excess volume of working fluid 16 produced at step 108 is vented and recaptured in secondary pressure vessel 28.

For some solid materials 12 (e.g. rocks) the tensile strength of such solid materials 12 is much lower than the compressive strength. For this reason, method 100, which takes advantage of the relatively low tensile strength of some solid materials 12, may use substantially less energy than conventional crushing and grinding comminution methods that rely on compressive and/or shear forces to break solid materials (e.g. ore-bearing rocks).

Various techniques may be employed to reduce the density of (i.e. expand) working fluid 16 at step 108. In some embodiments, the density of working fluid 16 may be reduced by causing a phase change of working fluid 16. For example, the density of working fluid 16 may be reduced by causing a phase change of working fluid 16 from a supercritical phase to a subcritical vapour phase. This phase change may cause a rapid expansion (e.g. at the speed of sound, or in special cases such as the unstable vaporization that may occur from dropping the working fluid pressure into the vapour dome and crossing the spinodal curve from the superheated liquid side, a supersonic expansion) of working fluid 16.

The phase change may be achieved by lowering the pressure of working fluid 16 within first chamber 14A. The phase change may be achieved by lowering of the pressure to below a critical pressure of working fluid 16. For example, where working fluid 16 comprises $CO_2$, the working fluid 16 may be expanded by reducing the pressure of working fluid 16 within first chamber 14A to below 73.8 bar.

In some embodiments, step 108 comprises reducing the pressure of working fluid 16 within first chamber 14A by releasing a mass of working fluid 16 through an outlet 14B. Outlet 14B may be opened and closed by one or more valves 26. Valve(s) 26 may be controlled manually by an operator or by a controller (e.g. controller 22). Valve(s) 26 may comprise any suitable valve(s). For example, valve(s) 26 may comprise a snap open or pop open valve. Valve(s) 26 may be capable of fully opening in approximately 30 ms, 10 ms, 5 ms, 3 ms, 1 ms or less.

Outlet 14B may comprise one or more filters, particle separators, particle trapping processors or the like to prevent particles of solid materials 12 from escaping first chamber 14A undesirably through outlet 14B. Valve(s) 26 may comprise one or more features to prevent particles of solid materials 12 from escaping first chamber 14A undesirably.

In some embodiments, as a pressure of working fluid 16 within first chamber 14A is increased, some working fluid 16 within first chamber 14A is exhausted to prevent damage to first pressure vessel 14. In some embodiments, working fluid 16 is exhausted through one or more blow-off valves configured to prevent the pressure in first chamber 14A from exceeding a threshold. In some embodiments, such blow-off valves (e.g. blow-off valves 14C) are separate from outlet 14B. In some embodiments, such blow-off valves are integrated with outlet 14B to allow any exhausted working fluid 16 to be recaptured with other working fluid 16 exhausted through outlet 14B, if desired.

In some embodiments, method 100 comprises repeating steps 104 through 108 one or more times for the same instance of solid materials 12. Each time that steps 104 through 108 are repeated, working fluid 16 may be able to penetrate deeper into the porous structure of solid materials 12 which may allow for further reduction of size of solid materials 12. In some embodiments, solid materials 12 are screened for size after removal from first chamber 14A. Any particles that are not sufficiently small may be returned to first chamber 14A for further processing. In some embodiments, solid materials 12 are screened for size before removal from first chamber 14A. In this way, solid materials 12 may undergo repeated cycles of steps 104 to 108 until sufficient comminution has occurred without being removed from first chamber 14A.

In some embodiments apparatus 10 provides a way to monitor a degree of comminution of solid materials in first pressure vessel 14. For example, first pressure vessel 14 may comprise a window or a camera to allow an operator to see into first chamber 14A to determine if sufficient comminution has occurred and/or apparatus 10 may include a remote sensing system such as an ultrasound imaging system or an acoustic sensor that produces output images or signals that are indicative of a degree of comminution of the solid materials in pressure vessel 14A. It may be possible to predict a desired number of cycles of steps 104 through 110 based on one or more characteristics (e.g. mass, composition, volume, porosity, etc.) of solid materials 12.

In some embodiments, working fluid 16 that is exhausted through outlet 14B is exhausted into the atmosphere. In some embodiments, working fluid 16 that is exhausted through outlet 14B is recaptured for further use.

In some embodiments, working fluid 16 that is exhausted through outlet 14B is recaptured in a second chamber 28A of a second pressure vessel 28. Second pressure vessel 28 may comprise any suitable pressure vessel. In some embodiments, second chamber 28A has a greater volume than first chamber 14A to accommodate lower density working fluid 16 exhausted from outlet 14B.

In some embodiments, working fluid 16 recaptured in second chamber 28A has a pressure greater than atmospheric pressure. Therefore, to increase the pressure of working fluid 16 recaptured in second chamber 28A to operating pressure, $P_{op}$, involves a smaller increase in pressure (than if pressurized from atmospheric pressure) and less energy to do so. Further, by recapturing working fluid 16 instead of venting it into the atmosphere, less working fluid 16 is released into the atmosphere and potential environmental harm of method 100 is reduced.

In some embodiments, working fluid 16 recaptured in second chamber 28A is injected into first chamber 14A at step 104 to achieve $T_{op}$ and $P_{op}$.

In some embodiments, working fluid 16 flows from second chamber 28A to first chamber 14A at step 104 through conduit 16B and pump 18. Optionally, pump 18 pressurizes working fluid in a high pressure reservoir 23 and the pressurized working fluid 16 is metered into first chamber 14A by way of a controlled valve 23A.

In some example embodiments, a valve 32 is employed to control whether working fluid 16 is delivered to first chamber 14A from working fluid source 16A, from second pressure vessel 28A or some combination thereof. Valve 32 may be controlled manually or by a controller (e.g. controller 22). For example, if controller 22 (or an operator) determines that there is an insufficient pressure of working fluid 16 within second pressure vessel 28, working fluid 16 may be delivered from working fluid source 16A at step 104.

In some embodiments, working fluid 16 flows from second chamber 28A to first chamber 14A at step 104 through valve(s) 26 and outlet 14B. An optional pump or compressor (not illustrated) may be provided to deliver working fluid 16 into first chamber 14A through outlet 14B. In some embodiments, the optional pump or compressor is integrated into second pressure vessel 28.

In some embodiments, working fluid 16 is provided to second pressure vessel 28 from working fluid source 16A to counteract undesirable loss of working fluid 16 or to increase a ratio of working fluid 16 to other fluids within second pressure vessel 28.

Apparatus 10 may comprise one or more sensors and one or more controllers to monitor and/or control the temperature and pressure of working fluid 16 within second chamber 28A. For example, in the illustrated embodiment, apparatus 10 comprises a pressure sensor 30A for measuring the pressure within second chamber 28A and a temperature sensor 30B for measuring the temperature within second chamber 28A. Pressure sensor 30A and temperature sensor 30B may be connected to controller 22 (or another suitable controller). Controller 22 may monitor the pressure within second chamber 28A to facilitate transfer of working fluid 16 from second chamber 28A to first chamber 14A. Similarly, controller 22 may monitor the temperature within second chamber 28A to facilitate transfer of working fluid 16 from second chamber 28A to first chamber 14A.

In some embodiments, working fluid 16 is exhausted through one or more blow-off valves 28B configured to prevent the pressure in second chamber 28A from exceeding a threshold value.

After step 108, if solid materials 12 are sufficiently pulverized (or if steps 104 to 108 have been repeated a designated number of times), method 100 continues to step 110. At step 110, fractured solid materials 12' are removed from first pressure vessel 14.

In some embodiments, removing fractured solid materials 12' from first chamber 14A comprises depressurizing first chamber 14A (e.g. to at or near atmospheric pressure) before removing fractured solid materials 12' from first chamber 14A by, for example, removing cover 14D.

In other embodiments, fractured solid materials 12' are removed without depressurizing first chamber 14A or while maintaining a pressure in first chamber 14A that is higher than atmospheric pressure. For example, an airlock, rotary valves, a lock hopper, plug-forming feeders, piston feeders, dynamic feeders and/or slurry feeders may be employed for removal of fractured solid materials 12' while first chamber 14A is maintained at a pressure greater than atmospheric pressure. In some embodiments, the same feature (e.g. an airlock, rotary valves, a lock hopper, plug-forming feeders, piston feeders, dynamic feeders and/or slurry feeders) is used for insertion and removal of solid materials 12 and fractured solid materials 12'. In some embodiments, separate features (e.g. an airlock, rotary valves, a lock hopper, plug-forming feeders, piston feeders, dynamic feeders and/or slurry feeders) are provided for insertion and removal of solid materials 12 and fractured solid materials 12'.

In some embodiments solid materials 12 and working fluid 16 are ejected from first chamber 14A into second chamber 28A together. For example, upon opening one or more valves, the contents of first chamber 14A (e.g. solid material 12, working fluid, filler material if present, and slurrying liquid, if present) may be ejected from first chamber 14A into second chamber 28A. The ejection may be driven by pressure differential between the higher pressure of first chamber 14A and the significantly lower pressure of second chamber 28A. In some embodiments first chamber 14A is located above second chamber 28A so that the ejection is assisted by gravity.

Upon opening the valve(s) to allow the ejection of the materials from first chamber 14A to second chamber 28A, the materials experience a sudden pressure drop. This pressure drop may cause the working fluid to transition from a supercritical phase to a gas phase.

The rate at which the pressure drops may be increased by making the valve(s) through which the materials are ejected have a large cross sectional area, using plural valves, and/or opening the valves rapidly. In some embodiments the materials exit into second chamber 28A through a nozzle shaped to provide a rapid depressurization of materials as they pass out of the nozzle into second chamber 28A.

The magnitude of the pressure drop depends at least in part on the relative volumes of first chamber 14A and second chamber 28A. The magnitude of the pressure drop may be increased by increasing the size of second chamber 28A. In some embodiments the reduced pressure after the pressure drop remains significantly higher than atmospheric pressure.

In some embodiments the mixture of solid material 12 and working fluid is depressurized in first chamber 14A and subsequently released into second chamber 28A for collection/separation etc. Such embodiments may include valves that may be opened to rapidly vent working fluid from first chamber 14A to cause a sudden pressure drop in first chamber 14A. For example, pressure may be equalized or partially equalized between first chamber 14A and second chamber 28A and then fractured solid material 12 may be transferred to second chamber 28A by opening a gate, chute, or the like.

In some embodiments the mixture of solid material 12 and working fluid in first chamber 14A is cycled two or more times between a higher pressure and a lower pressure. The profile of pressure as a function of time may include rapid decompressions. The rapid decompressions may cause the working fluid in first chamber 14A to transition from a supercritical state to a gas state, a liquid state or a multiphase gas/liquid state. Between the rapid decompressions the pressure may be increased so that working fluid in first chamber 14A is again in the supercritical state. Subsequently the mixture of solid material 12 and working fluid in first chamber 14A may be ejected into second chamber 28A as described above.

In some embodiments first chamber 14A includes a series of two or more chambers. Solid material 12 may be processed in sequence in the two or more chambers. In each of the chambers, the solid material may be received, pressurized with working fluid (optionally pressurized and depressurized in the chamber one or more times), and subsequently expelled into a next one of the chambers (or expelled into second chamber 28A from the last one of the two or more first chambers 14A).

In any of the described embodiments, working fluid may be collected and reused. For example, working fluid may be collected from second chamber 28A and/or from another volume into which the working fluid has been vented for reuse.

In some embodiments fractured material 12' has a particle size of 1 mm or less or 500 μm or less or 250 μm or less. The apparatus and methods described herein may, for example, be applied in applications for which ball mills are conventionally used.

Figure 3:
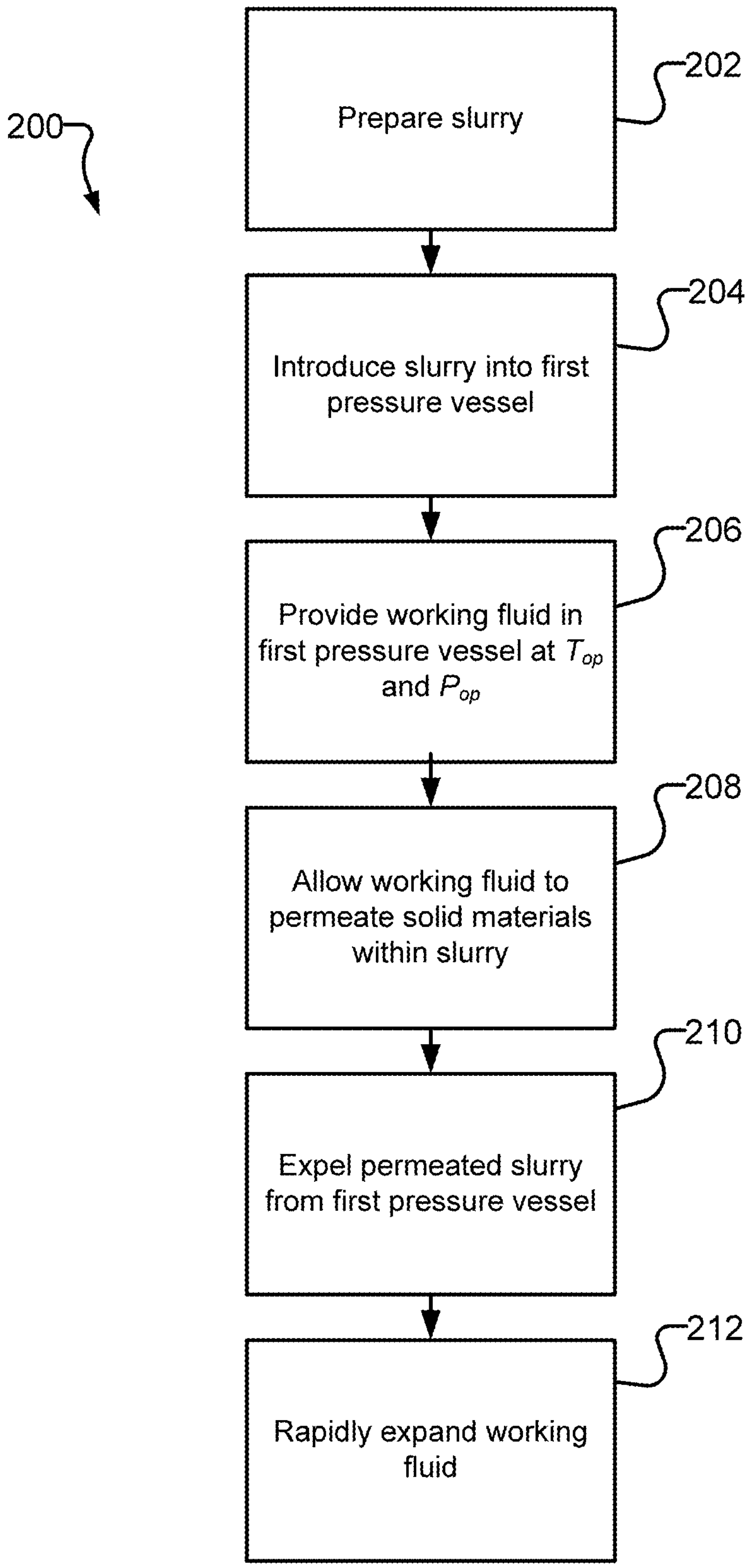
FIG. 3 depicts another exemplary non-limiting method for comminution of solid materials according to one embodiment of the invention.
Figure 4:
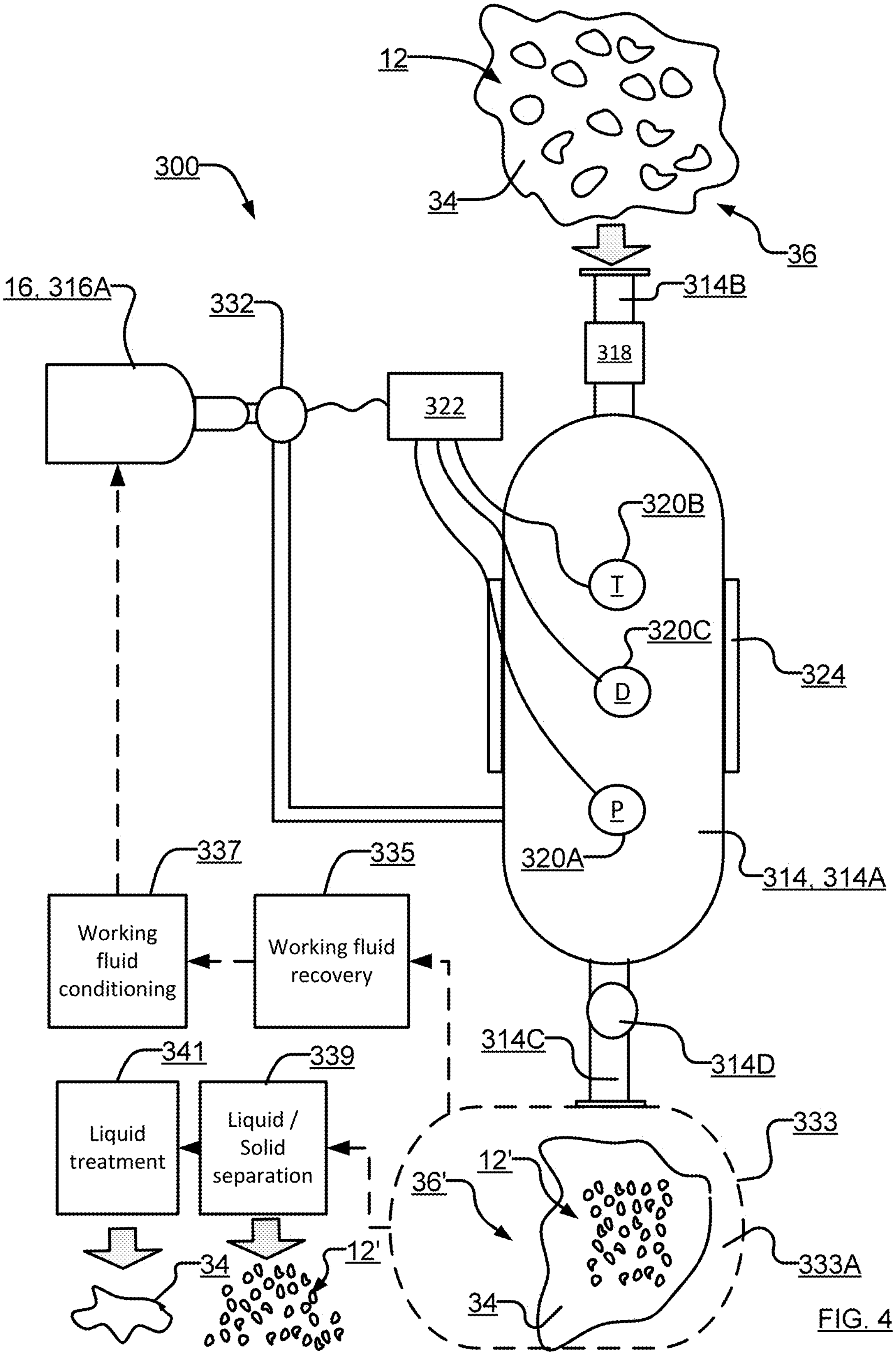
FIG. 4 depicts another exemplary non-limiting apparatus for comminution of solid materials according to one embodiment of the invention.

FIG. 3 depicts another exemplary, non-limiting method 200 for comminution of solid materials 12 to produce fractured solid materials 12'. FIG. 4 depicts an exemplary, non-limiting apparatus 300 that may be employed to carry out method 200. It should be understood that method 200 may be carried out on apparatuses other than apparatus 300 and methods other than method 200 may be carried out on apparatus 300.

Method 200 is substantially similar to method 100 except as described herein. For example, like method 10, method 200 involves allowing a working fluid 16 to permeate solid materials 12 and then rapidly expanding working fluid 16 to produce fractured solid materials 12'. However, unlike method 10, method 200 comprises mixing solid materials 12 with a liquid 34 to form a slurry 36 for use in part of, or throughout method 200, as described further herein. Likewise, apparatus 300 is substantially similar to apparatus 100 except as described herein. For example, like apparatus 100, apparatus 300 comprises a first pressure vessel 314 having a first pressure chamber 314A in which solid materials 12 (as part of slurry 36) are exposed to working fluid 16 at operating pressure, $P_{op}$, and operating temperature, $T_{op}$. However, unlike in apparatus 10, the pressure of working fluid 16 is maintained at a relatively constant level throughout method 200 and working fluid 16 that has permeated into solid materials 12 (as part of slurry 36) is caused to rapidly expand by expelling slurry 36 from first pressure chamber 314, as described further herein.

Method 200 may start at step 202. Step 202 comprises preparing a slurry 36. Slurry 36 may comprise a mixture of solid materials 12 and liquid 34. In some embodiments, liquid 34 comprises water. In some embodiments, liquid 34 comprises liquid $CO_2$. In some embodiments, liquid 34 comprises water with some dissolved salt. The dissolved salt may reduce the ability of liquid 34 to absorb working fluid 16, which may reduce the amount of working fluid 16 required at step 206. In some embodiments liquid 34 includes one or more leaching agents. The leaching agents may, for example include acids. The leaching agents may help to liberate desired minerals from solid material 12 (e.g. by leaching) while the solid material is being processed in method 200.

Slurry 36 may be prepared by any suitable technique. In some embodiments, slurry 36 is made by mixing solid materials 12 and liquid 34 in a mixing tank such as, but not limited to, a rotating drum. In some embodiments, solid materials 12 may be sufficiently fine that combining solid materials 12 and liquid 34 in a tank (or the like) may provide sufficient mixing. In some embodiments, slurry 36 may be processed in one or more ways before method 200 proceeds to step 204. For example, slurry 36 may be aerated, filtered, heated, etc. In some embodiments, working fluid 16 may be dissolved in slurry 36 before proceeding to step 204.

At step 204, slurry 36 is introduced into a first chamber 314A of a first pressure vessel 314. Slurry 36 may be introduced into first pressure vessel 314 through an inlet 314B by one or more pumps 318. Pump(s) 318 may comprise one or more centrifugal pumps, piston pumps, rotary vane pumps, etc. Pump(s) 318 may allow for continuous delivery of slurry 36 into first chamber 314A of first pressure vessel 314. A rate of flow of slurry 36 through inlet 314B may be monitored using one or more flow sensors. Pump(s) 318 may be controlled based at least in part on the output of such flow sensors.

At step 206, a working fluid 16 is provided in first pressure vessel 314 at operating temperature, $T_{op}$ and operating pressure, $P_{op}$. Step 206 may be substantially similar to step 104 except that step 206 may occur continuously during method 200. Working fluid 16 may comprise any suitable working fluid, as discussed herein. As compared to step 104, step 206 may use a relatively lower volume of working fluid 16 due to the amount of space inside first chamber 314A occupied by fluid 34 of slurry 36. Moreover, because it uses less energy to pressurize an equal volume of liquid and an equal volume of gas, method 200 may use less energy to achieve $P_{op}$ as compared to method 100.

Like apparatus 10, apparatus 300 may comprise one or more sensors and one or more controllers to monitor and/or control the temperature and pressure of working fluid 16 and slurry 36 within first chamber 314A. For example, in the illustrated embodiment, apparatus 300 comprises a pressure sensor 320A for measuring the pressure within first chamber 314A and a temperature sensor 320B for measuring the temperature within first chamber 314A. Pressure sensor 320A and temperature sensor 320B are connected to a controller 322. Controller 322 may monitor the pressure within first chamber 314A and controller 332 may control pump 318, a valve 314D of outlet 314C and/or a valve 332 of a working fluid source 316A to achieve operating pressure, $P_{op}$. Similarly, controller 322 may monitor the temperature within first chamber 314A and control a heat source 324 (which may be similar to heat source 24 of apparatus 10) to achieve operating temperature, $T_{op}$.

Step 208 of method 200 comprises allowing working fluid 16 to permeate into solid materials 12 within slurry 36 during a permeation time, $t_p$ to form a permeated slurry 36'. Step 208 may be substantially similar to step 106 of method 100, except for the presence of liquid 34. In some embodiments, permeation time, $t_p$, is in the range of about 0 to about 60 seconds. During step 106, working fluid 16 may penetrate into a porous structure of solid materials 12. In some embodiments, longer permeation times, $t_p$, may increase the depth of permeation of working fluid 16 into solid materials 12 and may decrease the size of fractured solid materials 12' resultant from method 200.

At step 208, some working fluid 16 may be absorbed by or dissolved in liquid 34 of slurry 36. In some embodiments, liquid 34 is caused to be saturated with working fluid 16 such that additional working fluid 16 can better permeate solid materials 12. Due to surface tension, working fluid 16 may permeate solid materials 12 while liquid 34 does not substantially permeate solid materials 12.

In some embodiments, to improve permeation of working fluid 16 into solid materials 12, step 208 of method 200 comprises separating slurry 36 back into solid materials 12 and liquid 34 within first pressure chamber 314A. This may be accomplished by one or more screens provided within first pressure chamber 314A, a cyclonic particle separator. a screw conveyor with a screen or any other suitable apparatus. Once separated, solid materials 12 may be permeated by working fluid 16 without or with minimized interference by liquid 34 (e.g. similar to step 106 of method 100). After solid materials 12 are sufficiently permeated by working fluid 16, solid materials 12 may optionally be re-combined with liquid 34 to form a permeated slurry 36'.

Once solid materials 12 are sufficiently permeated by working fluid 16, permeated slurry 36' is expelled from first pressure chamber 314A through outlet 314C. In some embodiments, outlet 314C comprises an orifice, nozzle or flow restrictor sized to allow a measured amount of permeated slurry 36' to be expelled at a given pressure. In some embodiments, the rate of expulsion of permeated slurry 36' from first chamber 314A is maintained substantially equal to the rate of introduction of slurry 36 into first chamber 314A. Maintaining these rates approximately equal to one another, may facilitate maintenance of $P_{op}$ within first chamber 314A during method 200.

As solid materials 12 are expelled from outlet 314C, solid materials 12 will experience a rapid and significant drop in pressure (e.g. from $P_{op}$ to atmospheric pressure or to a reduced pressure that is between $P_{op}$ and atmospheric pressure). This rapid and significant drop in pressure may cause working fluid 16 within solid materials 12 to rapidly expand (e.g. similar to in step 108 of method 100) at step 212. As working fluid 16 expands, working fluid 16 may drive a pressure wave through solid materials 12 from within cracks and pores of solid materials 12, thereby causing fracturing and pulverization driven from within to produce fractured solid materials 12'.

Unlike method 100 and apparatus 10, method 200 may not need a rapid expansion valve (e.g. valve 26) or other mechanical means to cause a rapid decrease in pressure. As such, method 200 and apparatus 300 may be less costly and easier to maintain. Further, by not relying on a change in pressure within first pressure vessel 314, method 200 and apparatus 300 do not use additional energy for repeated increases in pressure within first chamber 314A. Further still, by not relying on a change in pressure within first pressure vessel 314, method 200 and apparatus 300 may be operated with a continuous feed of slurry 36.

In some embodiments, outlet 314C may direct permeated slurry 36' toward an interaction zone in which impact of fractured solids 12' against other objects in the interaction zone may cause further comminution of solid materials 12 within permeated slurry 36'. The interaction zone may, for example comprise a hard surface, a pool of permeated slurry 36' or other expelled fractured solid materials 12'. Since permeated slurry 36' may be expelled from outlet 314C at a high velocity, the impact of permeated slurry 36' with other objects in the interaction zone upon expulsion from outlet 314C may cause further comminution of solid materials 12 within permeated slurry 36' without any further energy being used.

Apparatus 300 optionally includes an expansion vessel 333 including a chamber 333A into which permeated slurry 36' is expelled from first chamber 314A. Permeated slurry 36' may be expelled into expansion vessel 333 by gravity and/or pressure differential between first chamber 314A and expansion chamber 333A.

Working fluid (e.g. $CO_2$) may be collected from expansion vessel 333 by a working fluid recovery system 335 which may, for example, comprise a suitable pump and/or compressor. Recovered working fluid may be conditioned in a working fluid conditioner 337 before being returned to working fluid source 316A. The conditioning may, for example comprise removing particulates, removing contaminants, pressurizing and/or temperature adjustment. The functions of working fluid recovery system 335 and working fluid conditioner 337 may be combined.

Treated slurry may be delivered from expansion chamber 333A to a liquid/solid separation system 339 which separates the treated slurry into fractured solids 12' and liquid 34 (e.g. water). Separated liquid 34 may be treated in a liquid treatment system 341. Treatment system 341 may, for example perform one or more of removing particulates (e.g. by filtering, settling and/or centrifugation), degassing, removing contaminants (e.g. carbonic acid) and adjusting temperature. Treated liquid 34 may be released and/or recycled to make more slurry 36 for input to apparatus 300.

In some embodiments, if fractured solids 12' are not sufficiently comminuted by method 200, fractured solid materials 12' can be returned to slurry 36 to undergo further processing according to method 200. For example, in some embodiments solid materials 12' (or permeated slurry 36') are filtered or screened after step 212 to remove undesirably large pieces of solid materials 12' and such undesirably large pieces of solid materials 12' may undergo further processing according to method 200.

As suggested herein, method 200 and apparatus 300 may be operated continuously (e.g. steps of method 200 can occur concurrently and in parallel). For example, new slurry 36 can be continuously prepared at step 202 and delivered through inlet 314B at step 204, while working fluid 16 is allowed to permeate into slurry 36 previously delivered into first chamber 314A at step 208 and while permeated slurry 36' is expelled from first pressure vessel 314 at step 210. In this way, method 200 and apparatus 300 may allow for a high throughput of solid materials 12 as compared to methods which require batch processing.

In some embodiments, rather than prepare slurry at step 202, slurry is prepared within first chamber 314A after step 208 and prior to step 210. In such an embodiment, solid materials 12 may be delivered into first pressure vessel 314 in a similar manner as in step 102 of method 100 (and first pressure vessel 314 may be suitably modified to accommodate such delivery of solid materials 12 into first pressure vessel 314).

Figure 5:
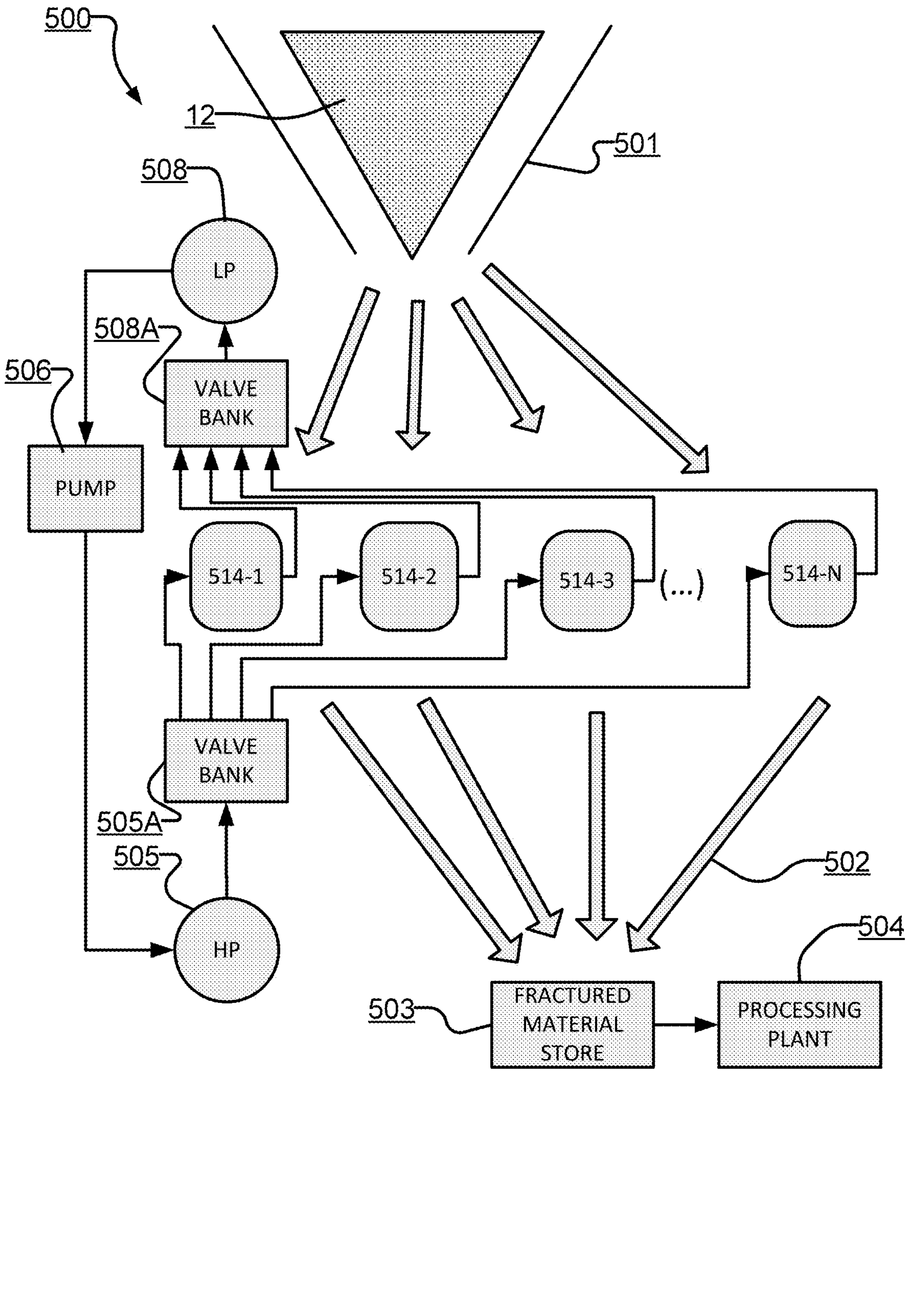
FIG. 5 is a schematic illustration showing apparatus for comminution of solid materials according to another example embodiment of the invention.

FIG. 5 shows schematically an example apparatus 500 according to an embodiment of the present invention. Apparatus 500 includes plural material fracturing units 514-1 to 514-N (generally and collectively units 514).

Each unit 514 includes one or more pressure vessels which may be as described elsewhere herein. For example, each unit 514 may include: a first pressure vessel 14 like that shown in FIG. 2; a first pressure vessel 14 accompanied by a second pressure vessel 28; as shown in FIG. 2; a first pressure vessel 314 as shown in FIG. 4, a first pressure vessel 314 accompanied by an expansion vessel 333 as shown in FIG. 4; parallel and/or serially connected groups of two or more of these etc.

In some embodiments, each unit 514 includes a sequence of two or more pressure vessels in which material may be fractured by methods as described herein. In such cases the material may be passed through the two or more pressure vessels in sequence and may receive processing in each of the pressure vessels before the material exits the unit 514.

In some embodiments, each unit 514 includes one or more expansion vessels into which fractured material may be delivered from a pressure vessel. In some such embodiments where the unit 514 includes plural pressure vessels each of the plural pressure vessels may receive processed (e.g. fractured) material from a corresponding one of the plural pressure vessels.

Units 514 may be operated in sequence according to methods as described herein to maintain a more or less constant output of fractured solid materials to a downstream processing plant 504. Units 514 are each connected to receive a working fluid from a high pressure supply 505 of a working fluid (e.g. supercritical $CO_2$). High pressure supply 505 may be maintained at a suitable pressure by pumps and/or compressors 506 which draw working fluid from a low pressure supply 508, pressurize the working fluid and deliver the pressurized working fluid to high pressure supply 505. Working fluid may be conditioned (e.g. to remove particulates and/or contaminants, to alter its temperature, to alter its pressure and/or to alter its physical phase) before being delivered into high pressure supply 505.

Apparatus 500 comprises an input material distribution system 501 which is operable to deliver solid materials 12 (e.g. rocks that have been graded and/or subjected to preliminary crushing to a size range suitable for processing in system 500) to any of units 514.

Apparatus 500 includes an output material distribution system 502 which is operable to receive fractured solid materials 12' that have been processed in pressure vessels 514 and to deliver fractured solid materials 12' to material store 503 from where fractured materials 12' may be processed in processing plant 504.

Apparatus 500 may, for example, be operated according to a method comprising:

a) placing a solid material to be fractured such as rocks (optionally together with a filler material) into a pressure vessel of a unit 514;
b) delivering high pressure working fluid (e.g. in the form of one or more bursts of high pressure working fluid such as $CO_2$) from high pressure supply 505 to the pressure vessel in the unit 514, This may be done by controlling valves in valve bank 505A to direct the high pressure working fluid to the desired pressure vessel of the unit 514;
c) subsequently recovering the working fluid from the unit 514; This may be done by controlling valves in valve bank 508A to collect working fluid from the desired pressure vessel of the unit 514;
d) conditioning the recovered working fluid to e.g. remove entrained solids and/or other contaminants and delivering the conditioned working fluid into low pressure supply 508;
e) removing the fractured solid material from unit 514.

any particular one of units 514 may be used to process solid materials at times that are staggered such that each of a plurality of units 514 may be at different stages in the above method at any given time.

In some embodiments at least some of the working fluid for step b) is delivered to a pressure vessel in a unit 514 from another pressure vessel. The other pressure vessel may be in the same unit 514 or a different unit 514. For example, step c) of the above method may include rapid decompression of a pressure vessel in a unit 514 through a fast valve, and directing a first portion of the high speed and high pressure working fluid exiting the pressure vessel into a pressure vessel in another one of units 514 that is taking in working fluid at step b) of the above method. In some embodiments step c) of the above method has plural stages. In one stage pressurized working fluid may be delivered into another pressure vessel of system 500 as described above. In another stage remaining working fluid from the pressure vessel may be directed to low pressure supply 508.

Apparatus according to the current invention (including apparatus 500) may include a process control system (not shown) that coordinates the operation of the apparatus, for example to perform methods as described above. The process control system may, for example, operate valves, monitor conditions, operate material handling systems etc.

In apparatus 500 and other embodiments as described herein) it may be beneficial to cause rapid pressure changes within pressure vessels (e.g. pressure vessels of units 514). This may be facilitated by one or more of:

- locating high pressure supply 505 close to the pressure vessels of units 514;
- providing a high pressure supply 505 that provides one or more accumulators located close to each unit 514;
- locating low pressure reservoir(s) 508 close to the pressure vessels of units 514;
- designing piping that carries working fluid from high pressure supply 505 to pressure vessels in units 514 and/or piping that carries working fluid from pressure vessels in units 514 to low pressure reservoir 508 to offer low flow resistance (e.g. by using large diameter piping and/or piping that includes plural pipes to deliver the working fluid into or take working fluid from individual pressure vessels);
- using low resistance valves to control flow of the working fluid;
- locating valves for controlling the flow of the working fluid close to ports by way of which the working fluid is delivered into or taken from pressure vessels of units 514;
- etc.

In apparatus as described herein that includes two or more pressure vessels for processing materials 12, it is an option to operate different ones of the pressure vessels to process materials out of phase with one another. This permits savings in operating expenses and capital costs, for example, by:

- allowing pressurized working fluid that is vented from one pressure vessel to depressurize the pressure vessel to be used directly to pressurize another one of the pressure vessels; and/or
- allowing supporting equipment such as expansion/collection chambers, high pressure supply of working fluid etc. to be shared among two or more of the pressure vessels.

In apparatus as described herein, pressure vessels and vessels for collecting vented working fluid may be connected in a geometrical arrangement in which each pressure vessel is in close proximity to a source of high pressure working fluid and a vessel into which the working fluid may be discharged. Energy may be conserved by direct venting of pressurized working fluid from one of the pressure vessels into another one of the pressure vessels. The direct venting may be by way of connections that provide low impedance to the flow of pressurized working fluid.

In any methods as described herein it may be desirable to process rocks or other irregularly shaped pieces of solid material. In such cases it can be beneficial to reduce the amount of void space in a pressure vessel. This may be done, for example, by introducing filler material into the void spaces. The filler materials may for example, comprise metal balls or other pieces of metal small enough to fit into the void spaces. The filler material may be added to solid materials being introduced into the pressure vessel (e.g. in step a) of the above method) and may be removed from the fractured solid material being removed from the pressure vessel (e.g. in step e) of the above method). The filler material may be continuously reused.

Interpretation of Terms

Various embodiments of apparatus and/or their components described herein may use similar reference numerals (e.g. with a preceding digit, a trailing symbol, a trailing letter and/or a trailing number) to those used to describe apparatus 10 and/or its components. Unless the context or description dictates otherwise, such apparatuses and/or their components may exhibit features and/or characteristics which may be similar to the features and characteristics of apparatus 10 and/or its components (or vice versa). For example, unless the context or description dictates otherwise, first pressure vessel 314 may have features and/or characteristics similar to those discussed herein for first pressure vessel 14 (or vice versa). Further, unless the context or description dictates otherwise, it should also be understood that when referring to features and/or characteristics of apparatus 10 and/or its components, the corresponding description should be understood to apply to any of the particular embodiments of apparatuses described herein and/or their components.

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Unless the context clearly requires otherwise, throughout the description and the claims, reference to a "pump" or "pumping" are to be construed to include compressors and compressing and any other apparatus or method of increasing the pressure of a fluid (e.g. working fluid 16).

Embodiments of the present invention include various operations, which are described herein. These operations may be performed by hardware components, software, firmware, or a combination thereof.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are described in different sentences, different sections or with reference to different figures of the drawings.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method for comminution of solid materials, the method comprising:

introducing solid materials into a first pressure vessel;

providing a working fluid in the first pressure vessel at an operating pressure and an operating temperature;

allowing the working fluid to permeate into the solid materials; and rapidly expanding the working fluid to thereby create fractured solid materials from the solid materials;

wherein the step of introducing the solid materials into the first pressure vessel comprises mixing the solid materials with a liquid to form a slurry and introducing the slurry into the first pressure vessel; and wherein the step of allowing the working fluid to permeate into the solid materials comprises separating the solid materials from the slurry and allowing the working fluid to permeate into the separated solid materials.

2. The method according to claim 1 wherein the step of rapidly expanding the working fluid comprises reducing the pressure of the working fluid from the operating pressure to a second pressure lower than the operating pressure.

3. The method according to claim 2 wherein the step of reducing the pressure of the working fluid from the operating pressure to the second pressure comprises reducing the operating pressure over a time period that is less than 30 ms.

4. The method according to claim 1 wherein the solid material comprise porous ore-bearing rock.

5. The method according to claim 1 wherein the working fluid comprises $CO_2$.

6. The method according to claim 1 comprising recombining the separated solid materials and the liquid to reform the slurry before rapidly expanding the working fluid to thereby create the fractured solid materials from the solid materials.

7. The method according to claim 1 wherein the step of rapidly expanding the working fluid to thereby create the fractured solid materials from the solid materials comprises expelling the slurry from the first pressure vessel into an environment having a pressure that is lower than a pressure within the first pressure vessel.

8. The method according to claim 7 wherein the step of expelling the slurry from the first pressure vessel comprises expelling the slurry into an expansion chamber and collecting the working fluid from the expansion chamber.

9. The method according to claim 7 comprising directing the expelled slurry at a solid surface to cause further pulverization of the fractured solid materials.

10. The method according to claim 7 comprising directing the expelled slurry to impinge against a medium containing additional fractured solid materials to cause further pulverization of the fractured solid materials.

11. The method according to claim 10 wherein the medium comprises a pool of the slurry.

12. The method according to claim 2 wherein the step of reducing the pressure of the working fluid to the second pressure comprises opening a valve to release at least some of the working fluid through the valve into a second pressure vessel for recapture.

13. The method according to claim 2 comprising after the step of rapidly expanding the working fluid and before removing the fractured solid materials from the first pressure vessel:

increasing the temperature of the working fluid in the first pressure vessel to the operating temperature;

increasing the pressure of the working fluid in the first pressure vessel to the operating pressure and rapidly expanding the working fluid to further fracture the fractured solid materials.

14. The method according to claim 13 wherein the step of increasing the pressure of the working fluid to the operating pressure comprises injecting working fluid recaptured in a second pressure vessel into the first pressure vessel, wherein the recaptured working fluid is recaptured during at least one of the steps of rapidly expanding the working fluid.

15. The method according to claim 14 comprising conditioning the recaptured working fluid by one of more of: compressing the working fluid, pressurizing the working fluid, liquefying the working fluid, removing solid particles from the working fluid, filtering the working fluid and removing containments from the working fluid prior to injecting the recaptured working fluid into the first pressure vessel.

16. The method according to claim 1 wherein the step of introducing the solid materials into the first pressure vessel comprises introducing the solid materials into the first pressure vessel through a first airlock, a first lock hopper or a first piston feed and wherein removing the fractured solid materials from the first pressure vessel comprises removing the fractured solid materials from the first pressure vessel through the first airlock, a second airlock, the first lock hopper, a second lock hopper, the first piston feed, a second piston feed, a rotary valve, a plug-forming feeder or a dynamic feeder.

17. An apparatus for comminution of solid materials, the apparatus comprising:

a first pressure vessel, the first pressure vessel comprising a first chamber;

a source of pressurized working fluid connected to deliver the pressurized working fluid into the first chamber through a second inlet;

a second pressure vessel connected to the first chamber by a first valve, wherein when the first valve is open, at least some of the working fluid within the first chamber is allowed to flow out of a first outlet and into a second chamber of the second pressure vessel;

a density sensor for measuring a density of the working fluid in the first pressure vessel; and a density controller connected to control one or both of the temperature and the pressure of the working fluid in the first pressure vessel in response to the density measured by the density sensor so as to maintain the density of the working fluid within the first pressure vessel within a desired density range.

18. A method for comminution of solid materials, the method comprising:

introducing solid materials into a first pressure vessel;

providing a working fluid in the first pressure vessel at an operating pressure and an operating temperature;

allowing the working fluid to permeate into the solid materials; and rapidly expanding the working fluid to thereby create fractured solid materials from the solid materials;

measuring a density of the working fluid in the first pressure vessel; and controlling one or both of the temperature and the pressure of the working fluid in the first pressure vessel in response to the measured density so as to maintain the density of the working fluid within the first pressure vessel within a desired density range.

* * * * *